Jan. 26, 1937.   H. D. EUWER   2,068,852
AIR CONDITIONING SYSTEM FOR RAILWAY CARS
Filed March 24, 1934   4 Sheets-Sheet 1
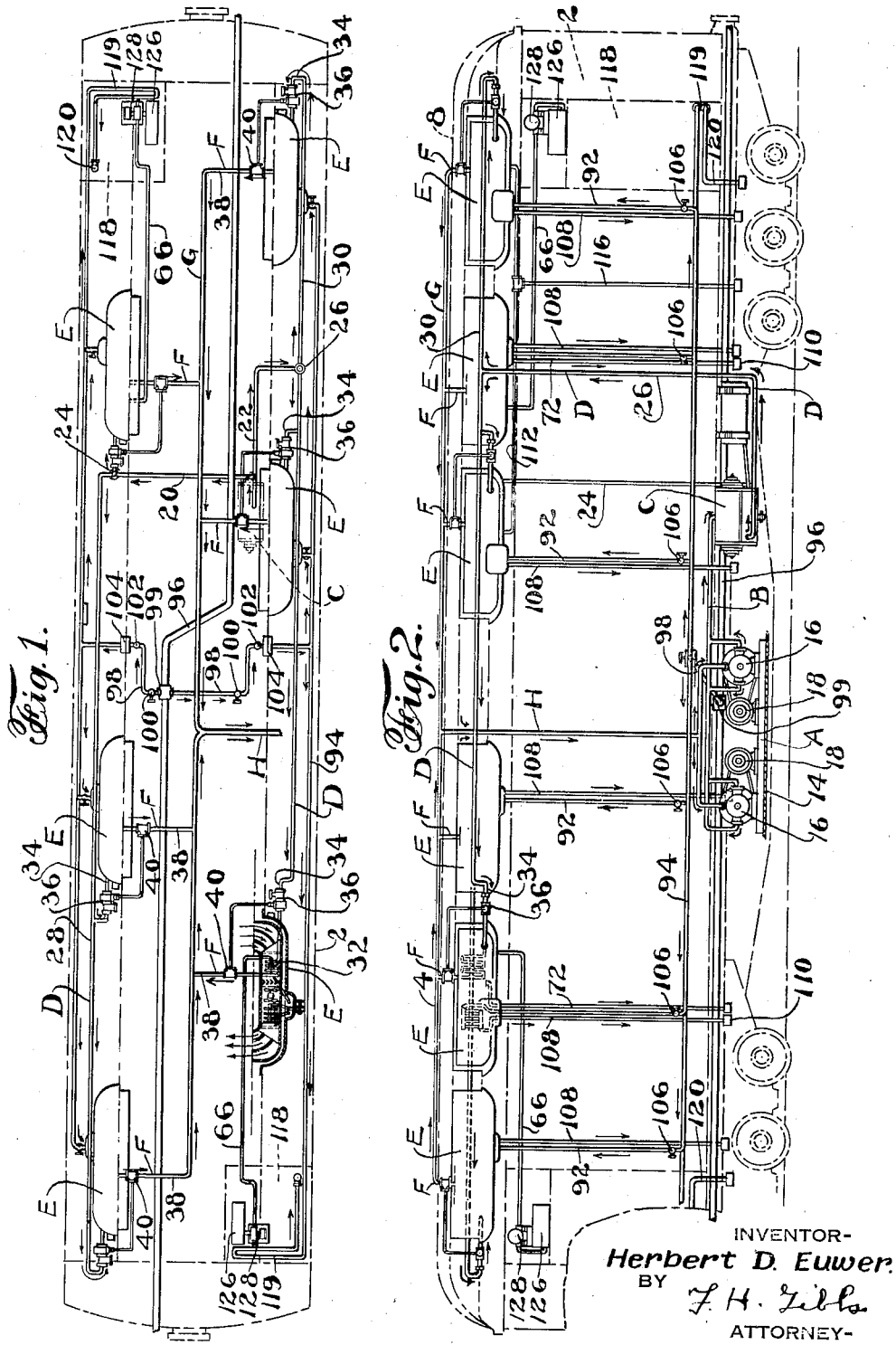
INVENTOR-
Herbert D. Euwer.
BY
ATTORNEY-

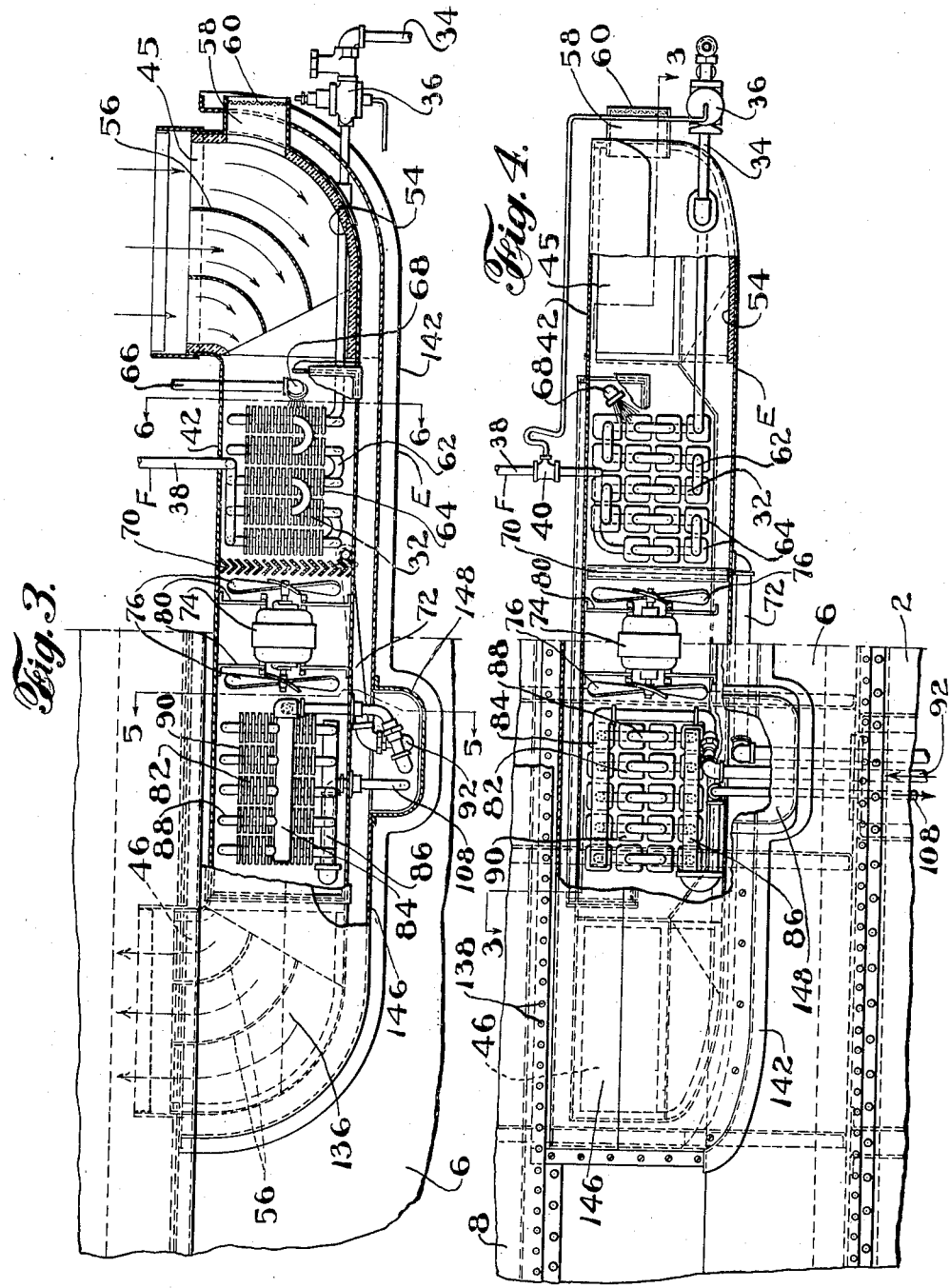

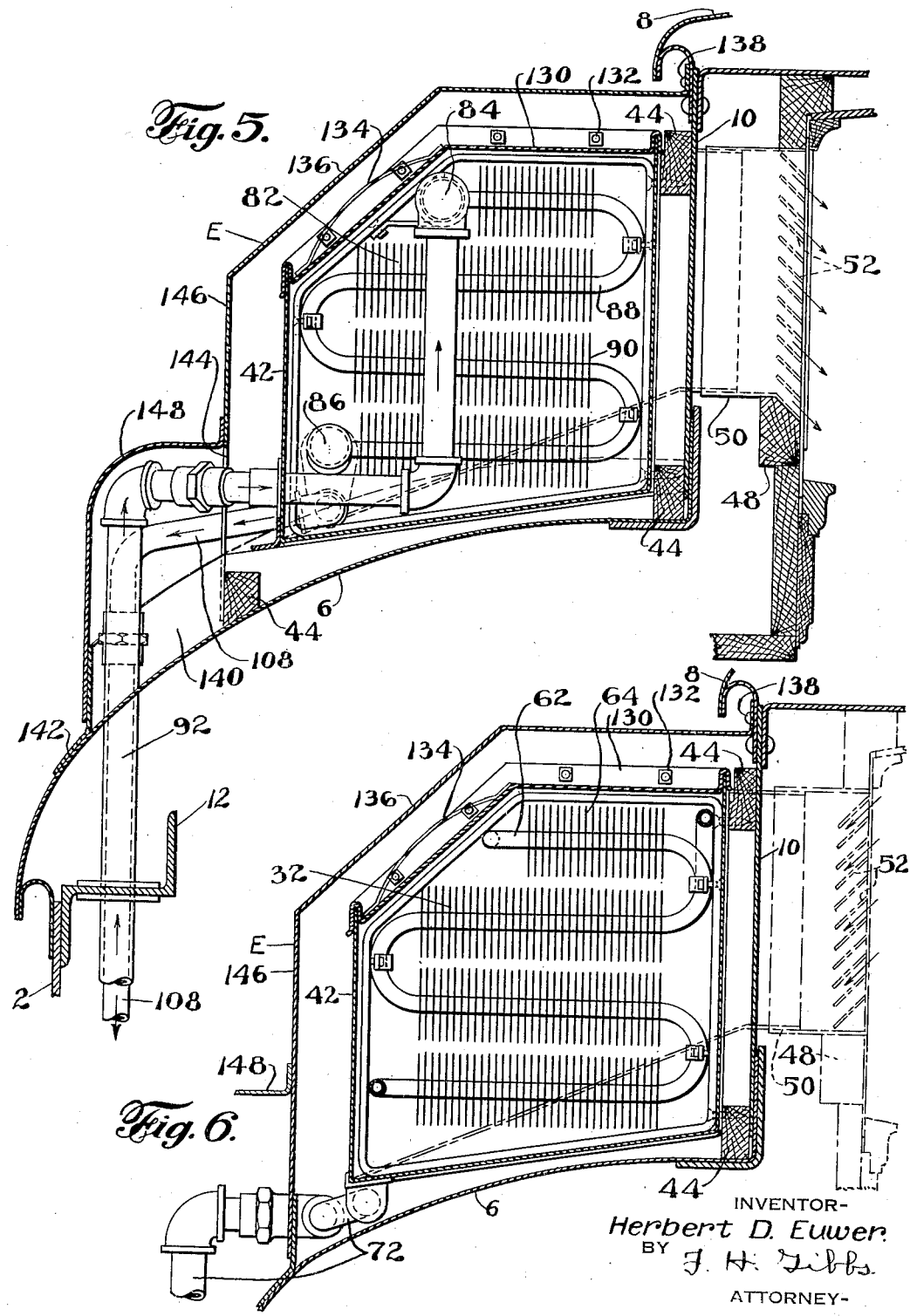

Patented Jan. 26, 1937

2,068,852

UNITED STATES PATENT OFFICE 2,068,852

AIR CONDITIONING SYSTEM FOR RAILWAY CARS

Herbert D. Euwer, St. Charles, Mo., assignor to American Car and Foundry Company, New York, N. Y., a corporation of New Jersey Application March 24, 1934, Serial No. 717,167

14 Claims. (Cl. 257—7)

This invention relates generally to air conditioning systems and has particular reference to means for temperature conditioning the air of railway passenger cars or other vehicles whereby to maintain proper and desired temperatures and air conditions within the passenger compartment of a car.

One object of this invention is the provision of an air conditioning system for railway cars which is so formed and arranged as to necessitate substantially no modification or alteration in the interior or passenger compartment of the car or of the car body.

Another object of this invention is the provision of an air conditioning system for railway passenger cars having means for withdrawing air from the interior or passenger compartment of the car and conditioning the same and re-circulating the conditioned air throughout said passenger compartment, the system having provision for either heating or cooling the air in accordance with required conditions or to humidify and heat the air to be re-circulated within the car body.

Still another object of this invention is the provision of an air conditioning system for railway cars which includes a plurality of independently functioning air conditioning units arranged and supported externally of the car body in such a manner as to receive air from the interior or passenger compartment of the car and to condition said air and re-circulate it within the car body.

A further object of this invention is the provision of a mechanical air conditioning system for railway passenger cars adapted to maintain air within the passenger compartment of the car in pre-determined and desired condition, said system being adapted to subject the air to cooling by a mechanical refrigerating or cooling unit.

A still further object of this invention is the provision of a new and improved air conditioning unit for use with railway passenger cars.

The present invention also contemplates a new and improved means for maintaining the air within a passenger compartment of a railway car in any desired or pre-determined heated condition.

Another object of this invention is the provision of a new and improved heating system for the air within a railway passenger car which is operative automatically in response to temperature conditions of the air within said passenger compartment.

This invention also contemplates the provision of a new and improved air conditioning system for railway passenger cars in which the parts thereof which may necessitate replacement or repair are located externally of the car thereby eliminating the necessity of structurally modifying the interior of the car.

Other objects and advantages of this invention will be apparent from the following description taken in conjunction with the accompanying drawings in which:

Figure 1 is a top plan view of the system of the present invention applied to a railway passenger car, the latter being shown more or less diagrammatically, one of the air conditioning units of said system being shown for the greater part in section;

Fig. 2 is a side elevation of the system applied to a railway car, the latter being shown in broken lines and more or less diagrammatically;

Fig. 3 is a view partly in plan and partly in section of one of the air conditioning units, a portion of the view also showing parts of a railway car, the view being taken on the line 3—3, Fig. 4;

Fig. 4 is a front elevation of the unit shown in Fig. 3, certain parts thereof being broken away and other parts being shown in section;

Fig. 5 is a sectional view on the line 5—5, Fig. 3;

Fig. 6 is a sectional view on the line 6—6, Fig. 3;

Figure 7:
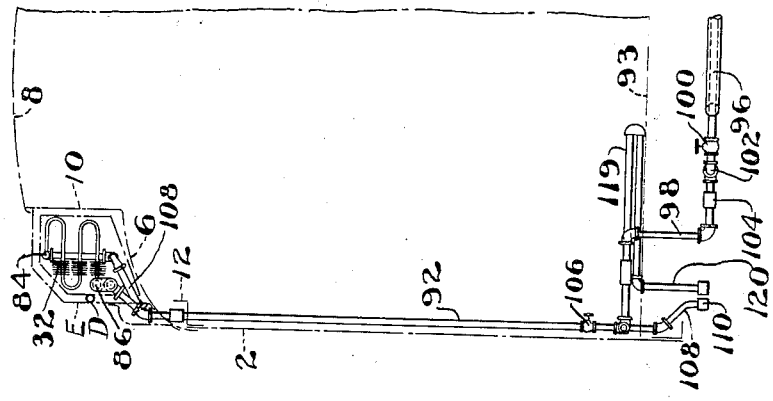
Fig. 7 is a sectional view through a portion of the car body, said body being shown more or less diagrammatically, and the view disclosing parts of the heating system for air.
Figure 8:
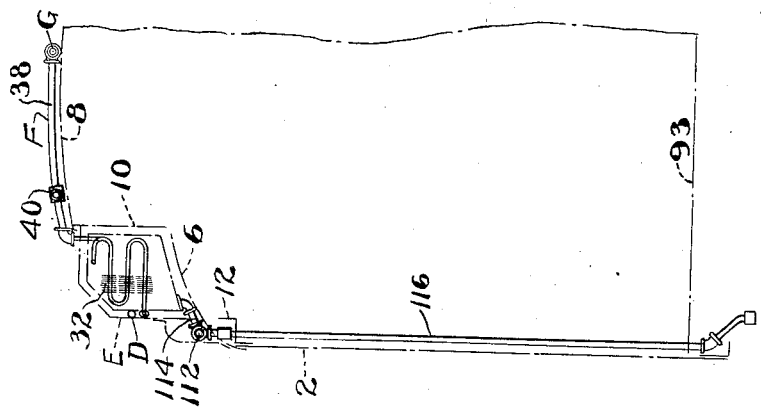
Fig. 8 is a sectional view similar to Fig. 7 but showing certain parts of the system for cooling the air.

Referring now more particularly to the drawings in which similar characters of reference designate similar parts in the several views, a railway passenger car is diagrammatically shown, said car being of the conventional monitor deck type and comprising a body having side walls 2 and a roof 4, the latter including a lower deck 6, an upper deck or clere-story 8 and a deck plate 10; the roof 4 being connected to side plates 12 which are in the form of Z-sections as more clearly shown in Fig. 5.

As will be apparent from the description to follow, the air conditioning system of the present invention is so designed that the interior of the car body need not be re-modeled or changed to any great extent for the reason that the air conditioning units of the present system are maintained and supported externally of the body where they are easily accessible for purposes of replacement or repair should occasion arise.

Referring now more particularly to Figs. 1 and 2 it can be seen that the system of the present invention comprises a compressor unit "A" connected by a gas line "B" to a condenser unit "C". The compressor and condenser units are supported beneath the floor of the car (see Fig. 2) and, leading from the condenser is a liquid line indicated generally at "D" which conveys refrigerant to individual and spaced air conditioning units "E" arranged in relatively staggered relation along opposite sides of the car and on the lower deck 6 of the car roof. Leading from the units "E" are exhaust or connection lines "F" which convey the refrigerant after its passage through the units "E" to a suction line "G" arranged longitudinally of the car body above and supported by the upper deck 8 and having connection with a return line "H" which leads back to the compressor.

Broadly, from the above description it can be seen that a suitable refrigerant such, for example, as methyl chloride or the like, may be forced from the condenser through the liquid line "D" to the several air conditioning units "E" where it will absorb heat from the air passing through said units and thus become changed to gaseous form and pass from the units to the suction line "G" and then back to the compressor "A" through the return line "H" where said gas is compressed and subsequently condensed to liquid in the condenser unit "C" for recirculating as just described. The air conditioning units are positioned externally of the car body but are so arranged as to receive air from the interior of the passenger compartment as will be more fully described hereinafter.

Referring now more in detail to the drawings, the compressor unit "A" is preferably arranged within a box 14 suspended from the underframe of the car, only a portion of said box being illustrated in the drawings (see Fig. 2). The compressor unit comprises a pair of pumps 16 each having a driving motor 18 and being adapted to compress gas and force the same through suitable connections to the gas line "B" and to the condenser "C" through said gas line. The condenser "C" is also supported in any suitable or desired manner from the underframe and is so formed as to condense the compressed gas received from the compressor "A" and pass the liquid through the liquid line "D", the latter including branch pipes 20 and 22 connected with riser pipes 24 and 26 arranged respectively along opposite sides of the car body (see Figs. 1 and 2) and extending upwardly inside of the side walls 2 of the car and through the side plates 12 and above the lower deck 6 and having their upper ends connected to feeder pipes 28 and 30 respectively as shown in Fig. 1. The feeder pipes 28 and 30 are supported in any suitable or desired manner externally of the car body and extend longitudinally thereof and are connected to cooling coils 32 forming parts of the air conditioning units "E" by branches 34 each having an expansion valve 36 therein. After passing through the cooling coils 32 of the several air conditioning units "E", the refrigerant, which by this time has absorbed heat units and hence been changed to gaseous form, passes out of the units "E" into the connection lines "F", shown as pipes 38 (see Figs. 1 and 4) and then into the suction line "G" from where, because of the operation of the pumps 16, it is withdrawn from the suction line "G" to the compressor unit "A".

The expansion valves 36 are automatically functioning having thermally responsive elements arranged within fittings 40 in pipes 38, said thermally responsive elements being operative in response to temperature conditions of the gas or refrigerant passing through the pipes 38 to control the operation of the valves 36 (see Fig. 4).

The air conditioning units "E" are preferably of the form shown in Figs. 3 to 6 inclusive and each comprises an elongated housing 42 secured to framing members comprising supports 44 attached to the deck plate 10 and deck 6, as shown more clearly in Figs. 5 and 6. The housings 42 are provided with air ingress and egress openings 45 and 46 respectively at their end portions and said openings are aligned with openings formed in the deck plate 10 and interior finish members 48 of the monitor deck as shown particularly well in Figs. 5 and 6. Short conduits 50 secured to the finish members 48 connect the housings 42 at the ingress and egress openings with the interior of the car body and these conduits 50 are preferably provided with adjustable shutter members 52 for regulating the extent of air opening whereby to control passage of air through said conduits. The ingress and egress end portions of the housings 42 may be and preferably are lined with suitable insulating material 54 and these end portions of the housings are preferably provided with curved partitions 56 so formed and arranged as to divide the air into a plurality of streams whereby to effect substantially equal distribution thereof both at the ingress and egress openings.

At the air ingress portion of the housing 42 a duct 58 is provided for the purpose of permitting the passage of outside air into the housing 42, said duct having a filter 60 therein and, if desired, being provided with suitable manually adjustable shutter means for controlling the admission of outside air into the housings. These shutter means are not shown in the drawings but obviously may be provided if desired.

As clearly shown in Figs. 3 and 4 the beforementioned cooling coil 32 is arranged adjacent the air inlet portion of housing 42 so that the incoming air will immediately contact therewith to be reduced in temperature. The cooling coil 32 comprises a pipe 62 having fins 64 for increasing the effective area thereof as shown in Fig. 6. The units "E" at diagonally opposite end portions of the car are provided with means for humidifying the air during its passage through the housings 42 and, as shown in Figs. 3 and 4, a spray pipe 66 extends into the housing adjacent the cooling coil 32 and is provided with a spray nozzle 68 for spraying water into the incoming air. In the construction shown in the drawings the spray is indicated as being directed toward the coil 32 but this is merely by way of example as the spray may be directed against the direction of the incoming air if desired. These end units, or, to be more exact, the units containing the humidifying device, are provided with eliminators 70 for removing excess and entrained moisture from the air, the eliminators being arranged within the housing 42 in such a position that the air passes therethrough subsequent to humidification by the spray and cooling by the coil 32. From the description just given it will be apparent that diagonally opposite end units "E" of the present system each include a combined air cooling and humidifying chamber one end wall of which is formed by eliminators 70. While the remainder of units "E" of the present system may be provided with air humidifying means it has been found in practice that under normal operating conditions it is only necessary to supply spray devices or humidifying means at certain of the units, those selected being diagonally oppositely arranged end units. The remainder of the units "E" are substantially similar in all respects to those provided with humidifying devices. In view of the humidifying device the housings 42 of the end units "E" containing said device, at the cooling and humidifying chambers are formed in any suitable or desired manner to prevent passage of water to the remainder of the housings, and drains 72 lead from the cooling and humidifying chambers and are arranged adjacent the side wall of the car as clearly shown in the drawings and extend through the side plates 12 with their discharge ends arranged below the bottom of the car as shown particularly in Fig. 2.

The housings 42 each include means for effecting circulation of air between the passenger compartment of the car and said housings, the means in the instance shown comprising a motor 74 and fans 76 operated thereby and so arranged as to draw air through the ingress opening 45 of the housing and to force the air through the housing and through the egress opening 46 into the car body. The motor is supported by suitable brackets 80 arranged within the housing and, in the instance shown, said motor is arranged approximately midway between the ends of the housing and between the cooling coil 32 and a heating coil indicated at 82 supported within the housing and comprises upper and lower headers 84 and 86 respectively and a coil 88, the latter being provided with fins 90 for increasing the effective surfaces thereof as particularly shown in Fig. 5. The heating coils 82 of the several units "E" are adapted to receive a heating medium such as steam through risers 92 extending upwardly from adjacent the bottom 93 of the car body through the side plates 12 and having their upper end portions connected with the upper headers 84 (see Fig. 5). The lower end portions of the steam risers 92 are each connected to distributor pipes 94 arranged within the car body and extending longitudinally thereof along opposite sides of the car, the pipes 94 receiving steam from the main steam line 96 through branches 98 coupled to the main steam line as shown at 99 and each branch provided with a manually operable cutoff valve 100, a reducing valve 102, and a magnetic control valve 104, all as clearly shown in Figs. 1 and 7. In order that steam may be shut off from one or more of the several units "E" to render the same ineffective for heating purposes, each of the risers 92 is provided with a manually operable shutoff valve 106. Leading from the lower header 86 of each heating coil 88 is a discharge pipe 108 which receives steam or water of condensation after its passage through the heating coil and discharges the same outside below the car bottom, the pipes 108 extending through the side plates 12 and through the car bottom and each having a trap 110 at its lower end portion as shown in Fig. 2. During operation of the system of the present invention water of condensation may collect in the housings 42 of the units "E" which are not provided with the water spray devices. To provide means for discharging this water of condensation drain pipes 112 are supported in any suitable manner on the deck 6 and are connected by branches 114 with the housings 42 in such a manner as to drain water of condensation from the interior of the housings to said pipes 112, the pipes 112 being arranged respectively along opposite sides of the car and each having a discharge pipe 116 leading therefrom and discharging below the car bottom.

At opposite ends of the car body saloons 118 are provided as is usual in passenger car construction and for heating these portions of the car the distributor pipes 94 at opposite end portions of the car are extended into these saloons 118 and are connected with steam heating coils 119 having discharge pipes 120 provided with traps arranged beneath the bottom of the car body as more clearly shown in Fig. 2.

Arranged within each saloon 118 adjacent the upper portion thereof and suitably supported are water storage tanks 126 and electrically operated pumps 128 for forcing water from the tanks to the spray pipes 66 into the adjacent air conditioning units "E".

As clearly shown in Figs. 3 to 6 inclusive, and as beforedescribed, the housings 42 are supported by members 44. Each housing is provided with a removable cover 130 secured in place by detachable fasteners 132. The cover 130 is provided with a handle element 134 and may be removed to permit access to the interior of the housing should occasion arise. Each air conditioner unit "E" also includes a shell or outer cover portion 136 which surrounds the housing 42 and which is detachably secured to the deck plate 10 by means of suitable fasteners such as screws 138. The shell 136 has its lower end portion overlappingly engaged with the upstanding flange 140 of a bottom attaching element 142 secured to the lower deck 6 as shown in Figs. 5 and 6. The steam pipes 92 and 108 and the water drain pipe 72 extend through a suitable opening 144 formed in the front wall 146 of the shell 136 and to cover the otherwise exposed portions of said pipes the shell is provided with an extension 148 forming a housing for said pipe, the lower edge portion of the extension 148 overlappingly engaging the upstanding flange 140 of the bottom attaching element 142, which latter at this portion is projected downwardly for the purpose of cooperating with the extension 148 as shown more clearly in Fig. 3.

From the above description it is believed it will be obvious to those skilled in the art that, in use, the blower means comprising the fans 76 and motor 72 will cause air to be withdrawn from the interior of the car body and pass through the housing 42 of the several air conditioning units "E" and then be discharged into the passenger compartment of the car body and that during the passage of said air through the units it is conditioned both as to temperature and as to humidity. In practice, the operation of the compressor unit is dependent upon temperature conditions within the passenger compartment of the car and suitable means operative in response to temperature conditions within the car may be provided such, for example, as a thermostat responsive to variations in temperature, said thermostat being connected to suitable switch mechanism for controlling the operation of the compressor unit and hence the entire refrigerating portion of the air conditioning system. Inasmuch as the control of compressors by a thermally responsive element is well known in the art and, further, inasmuch as the particular electric circuits form no part of the invention a thermostat and the connections thereof to the compressor are not shown in the drawings. For controlling the passage of spray water to the units provided with humidifying means, a humidostat or a similarly functioning element is preferably provided within the passenger compartment of the car, said humidostat being operative in response to variations in the humidity condition of the air and being connected with the pumps 128 for feeding water from the storage tanks 126 to the spray nozzles 68. The provision of humidostats for regulating flow of water being well known in the art, the drawings do not disclose this element.

During operation of the system of the present invention at the warmer seasons of the year or during seasons when it is necessary to cool the air instead of heat it, the valves 100 in branches 98 from the main steam line 86 are closed to prevent passage of steam to the units "E" and the system is strictly a cooling and humidifying system and it will be apparent that when the refrigerant is forced through the liquid line "D" to the several units and with the blower means in operation, air which is drawn through the units "E" is subject to the cooling action of the coils 32 to be reduced in temperature before being recirculated into the passenger compartment of the car. The end units supply properly humidified and cooled air to the passenger compartment as will be apparent. In the event the temperature within the passenger compartment of the car decreases below a predetermined point the thermostatic control for the compressor unit will cause the compressor unit "A" to cease its operation thereby preventing further passage of refrigerant through the system until such time as the temperature within the passenger compartment increases to a point such as to again set the compressor unit in operation. Passage of refrigerant through the individual units "E" is controlled or regulated by the valves 36 and it is apparent that the thermally responsive element in fitting 40 adjacent each unit operates in accordance with and in response to variations in the temperature of the refrigerant which passes through the connection lines 38.

During cooler seasons of the year it is necessary to re-heat the air after it has been cooled by the heat exchange coils or cooling coils 32 and to do this the valves 100 are opened by manual operation to permit discharge of steam from the main steam line 96 to the branches 98 and the headers 94. Because of the valves 106 steam may be admitted to any one or more of the air conditioning units "E" as desired. For controlling the passage of steam to the heating coils 82 in the units "E" a thermostat 150 is provided within the passenger compartment of the car which is operative in response to temperature conditions to control the magnetic control valves 104, the thermostat being suitably electrically connected with said control valves.

From the above description it is believed that those skilled in the art will recognize that the air conditioning system of the present invention provides for the maintenance of proper air conditions within the passenger compartment of a railway car; the air being withdrawn from the passenger compartment of the car and conditioned both as regards to temperature and humidity in a plurality of independently functioning units arranged externally of the car and then re-circulated into the passenger compartment; the present system providing for both heating and cooling the air and for properly humidifying the air in response to desired and required conditions.

The drawings illustrate certain embodiments of the invention but it is to be understood that they are for illustrative purposes only and various changes in the form and proportions of the arrangement may be made within the scope of the appended claims without departing from the spirit of the invention.

What is claimed is:

1. In combination with a railway passenger car, an air conditioning system comprising a refrigerant circuit having a compressor and a condenser, a pair of headers arranged exteriorly of the car and forming parts of the refrigerant circuit, a plurality of air conditioning units at the upper portion of the car and connected individually with said headers to receive refrigerant therefrom, air entrance and exhaust ports for each unit establishing communication between the interior of the car and the respective unit, and means associated with each of the units operative in response to variations in temperature conditions of the refrigerant subsequent to its passage through the units for controlling passage of refrigerant from the refrigerant circuit to said units.

2. In combination with a railway passenger car, an air conditioning system comprising a refrigerant circuit having a refrigerant compressor and condenser arranged beneath the bottom of the car, said circuit also including headers receiving refrigerant in condensed form, and a plurality of individually functioning air conditioning units arranged adjacent the roof and exteriorly of the car and provided with air entrance and exhaust ports for each unit establishing communication between the respective unit and the interior of the car, a heat exchange coil in each of said units, means for passing refrigerant from the headers through said heat exchange coils, and means associated with each of said units operative in response to variations in temperature of the refrigerant subsequent to its passage through the heat exchange coils for individually controlling passage of refrigerant to the coils.

3. A system for regulating the temperature of the air within a roofed enclosure comprising an air conditioning unit arranged outside the enclosure adjacent the roof, an air cooling coil in the unit, an air heating coil in said unit, a refrigerant circuit in which the cooling coil is arranged including a compressor and a condenser, blower means within the unit between the heating coil and cooling coil for effecting circulation of air between the enclosure and said unit, means operative in response to variations in temperature conditions of the refrigerant subsequent to its passage through the cooling coil for controlling passage of the refrigerant to said cooling coil, and means operative in response to variations in temperature within the enclosure for controlling the operation of the heating coil.

4. In combination with a railway passenger car, an air conditioning system comprising a refrigerant circuit having a compressor and a condenser therein arranged below the car body, a plurality of individually functioning air conditioning units supported on the car roof exteriorly of the car body and arranged in the refrigerant circuit, said units each having air entrance and exhaust ports communicating with the interior of the car body and spaced heat exchange coils therein, one of said coils being connected in the refrigerant circuit to receive the refrigerant therefrom and the other coil having connection with a source of heating medium, and blower means in the unit for effecting circulation of air between the interior of the car body and said units.

5. In combination with a railway passenger car, an air conditioning system comprising a refrigerant circuit having a compressor and a condenser therein arranged below the car body, a plurality of individually functioning air conditioning units supported on the car roof exteriorly of the car body and arranged in the refrigerant circuit, said units each having air entrance and exhaust ports communicating with the interior of the car body and spaced heat exchange coils therein, one of said coils being connected in the refrigerant circuit to receive the refrigerant therefrom and the other coil having connection with a source of heating medium, blower means in the unit for effecting circulation of air between the interior of the car body and said units, and means operative in response to variations in temperature of the air within the interior of the car body and the temperature of the refrigerant subsequent to its passage through the heat exchange coil for controlling operation of the respective heat exchange coils.

6. In combination with a railway passenger car, an air conditioning system comprising a refrigerant circuit having a compressor and a condenser therein supported below the car body and piping arranged exteriorly of the car body and including feeder pipes supported on the car roof, a plurality of air conditioning units supported on the car roof and in communication with the interior of the car body, cooling coils in the units and each individually connected with the feeder pipes to receive refrigerant therefrom, and thermally controlled means associated with each of said units for individually controlling passage of refrigerant therethrough.

7. In an air conditioning system for railway passenger cars, a plurality of individually functioning air conditioning units mounted exteriorly of the car body at the upper portion thereof and arranged in communication with the interior of the car body, each of said units including a heat exchange coil having an inlet and an outlet, a refrigerant circuit in which said coils are arranged, means in the outlet of a plurality of the coils adapted to control the inlet flow of refrigerant, a compressor and a condenser in the circuit, and means for causing circulation of air between the interior of the car body and said units.

8. In an air conditioning system for railway passenger cars, a plurality of individually functioning air conditioning units mounted exteriorly of the car body at the upper portion thereof and arranged in communication with the interior of the car body, each of said units including a heat exchange coil, a refrigerant circuit in which said coils are arranged, a compressor and a condenser in the circuit, means in the circuit between the compressor and unit to control the flow of refrigerant to the unit, means for causing circulation of air between the interior of the car and said units, and air humidifying means arranged in at least some of said units.

9. In an air conditioning system for railway passenger cars, a plurality of individually functioning air conditioning units mounted exteriorly of the car body at the upper portion thereof and arranged in communication with the interior of the car body, each of said units including a heat exchange coil, a refrigerant circuit in which said coils are arranged, a compressor and a condenser in the circuit, means for causing circulation of air between the interior of the car and said units, air humidifying means arranged in at least some of said units, and means associated with each of the units operative in response to variations in the temperature of the refrigerant subsequent to its passage through the heat exchange coil for controlling passage of refrigerant to said coils.

10. In an air conditioning system for railway passenger cars, a plurality of individually functioning air conditioning units arranged exteriorly of the car body on the roof thereof and in communication with the interior of the car body, said units each including means for effecting circulation of air between the interior of the car body and said units, means in the units for cooling the air, means in each of the units for increasing the temperature of the cooled air, means for circulating refrigerant through the air cooling means, and means operable in response to variations in temperature in the interior of the car body for controlling the operation of said heating means.

11. In a railway passenger car having saloons in the end portions thereof, an air conditioning system comprising a refrigerant circuit arranged exteriorly of the car body and having a compressor and a condenser therein positioned below the car body, a plurality of air conditioning units supported on the car roof and connected in said circuit for individual operation, said units being arranged along opposite sides of the longitudinal center line of the car with the units on one side in staggered relation with respect to the opposite units, cooling coils in said units connected with said refrigerant circuit, water spray devices in certain of the units, and water storage means in the saloons connected to the water spray devices.

12. In a railway passenger car, an air conditioning system comprising a plurality of air conditioning units supported on the car roof and provided with air inlet and air outlet ports in communication with the interior of the car body, a heat exchange coil in each of the units, a main steam line, distributor pipes in the car adjacent the lower portion thereof connected with the main steam line, risers extending upwardly from the distributor pipes to the respective heat exchange coils, and drains from the coils discharging outside the car body.

13. In a railway passenger car, an air conditioning system comprising a plurality of air conditioning units supported on the car roof and provided with air inlet and air outlet ports in communication with the interior of the car body, a heat exchange coil in each of the units, a main steam line, distributor pipes in the car adjacent the lower portion thereof connected with the main steam line, risers extending upwardly from the distributor pipes to the respective heat exchange coils, drains from the coils discharging outside the car body, and means operative in response to variations in temperature within the interior of the car body for controlling passage of steam to the distributor pipes.

14. In combination with a railway passenger car provided with a monitor deck, side walls and side plates, an air conditioning system comprising a plurality of independently functioning air conditioning units mounted on the lower deck and having air inlet and outlet ports communicating with the interior of the car body, each of said units having an air cooling means and an air heating means therefor, the latter means being arranged adjacent the air outlet ports, steam conduits arranged within the car adjacent the side walls and extending through the side plates into communication with the air heating means, drain conduits from the heating means discharging below the car body, means responsive to variations in temperature conditions within the car body for controlling passage of steam to the air heating means, a refrigerant circuit in which the air cooling means are arranged and means responsive to variations in temperature of the refrigerant subsequent to its passage through the air cooling means for controlling the admission of refrigerant to said air cooling means.

HERBERT D. EUWER.